United States Patent [19]

Lerner

[11] Patent Number: 4,553,495
[45] Date of Patent: Nov. 19, 1985

[54] CLEAT

[76] Inventor: Michael Lerner, 152 Marshall St., Duxbury, Mass. 02332

[21] Appl. No.: 531,814

[22] Filed: Sep. 13, 1983

[51] Int. Cl.[4] .............................................. B63B 21/08
[52] U.S. Cl. .................................. 114/218; 24/115 R; 24/130
[58] Field of Search ............. 114/218, 199; 24/115 R, 24/115 L, 115 N, 129 R, 130; D8/356

[56] References Cited

U.S. PATENT DOCUMENTS

| | | | |
|---|---|---|---|
| 85,612 | 1/1869 | Phillips | 114/218 X |
| 533,603 | 2/1895 | McEvoy | 114/218 X |
| 721,465 | 2/1903 | Reavley | 114/218 X |
| 3,838,659 | 10/1974 | Coleman, III | 114/218 |
| 4,397,253 | 8/1983 | Uecker | 114/199 X |

FOREIGN PATENT DOCUMENTS 873245  7/1961  United Kingdom ................ 114/218

Primary Examiner—Sherman D. Basinger
Attorney, Agent, or Firm—Thomas J. Engellenner

[57] ABSTRACT

A cleat is formed by a base plate and two dome-shaped, high friction surfaces, which secure a line or rope therebetween. In one preferred embodiment spiralling grooves form the high friction surfaces with the grooves following symmetrical opposing spirals on the two surfaces to permit easy insertion while also providing strong gripping action even against tension in the line. In another embodiment three dome-shaped elements are secured to a base plate with alternating spiralled-groove patterns to provide a convenient two line cleat which is useful, for example, in securing both lines from a jib when sailing.

9 Claims, 8 Drawing Figures

CLEAT

BACKGROUND OF THE INVENTION

Cleats are used in many applications where it is necessary to secure lines or ropes. In small boat sailing, cleats are commonly used to secure the jib sheet and the main sheet. In these applications a mooring plate or similar line-locking mechanism will not suffice because it does not permit the sailor to draw in the lines rapidly, as is needed for continual adjustment of the said trim, nor to release the lines quickly enough to prevent capsize.

Conventionally, the solution to this problem has been to use what is commonly referred to as a pivoting cam cleat. For example, typical cam cleats of various designs are shown in U.S. Pat. Nos. 3,265,032 issued Aug. 9, 1966; 3,730,129 issued May 1, 1973; and 4,084,532 issued Apr. 18, 1978. Essentially a cam cleat comprises a pair of spring-biased cam elements, or a single spring-biased cam element and an abutment that cooperate with each other to receive a line therebetween. The eccentricity of the cams is such that drawing a line in one direction causes the gap between the elements to widen and thus, the line to draw smoothly, while drawing the line in the opposite direction allows the gap to close and the line to be secured.

When a conventional cam cleat is used, difficulties are sometimes encountered, because, in order to release a locked line, a sailor must pull opposite the force exerted by the wind on the sail. Once the gap between the cam elements has been widened sufficiently by drawing in the line, the sailor may lift the line from the cleat and manually release it. However, in a strong wind, this task can be difficult to perform in time to prevent capsize. Another problem with conventional cam cleats occurs when the springs weaken or stick as a result of corrosion or salt. In these instances where the cams do not pivot freely, the cam cleat may not grasp the line unless it is closed manually.

SUMMARY OF THE INVENTION

My invention relates to an improved cleat and a method for securing lines. In particular, my invention concerns an improved cleat for use on sailboats, the cleat having high-friction domed surfaces which engage sailboat lines therebetween.

It has been discovered that a cleat comprising a base plate and at least two dome-shaped, high-friction surfaces, arranged in a close but non-contacting relationship, may be used advantageously to overcome the problems of prior art sailboat cleats when the domed surfaces are so arranged as to snugly grip both sides of the line. In addition to providing a means for shortening and securing rigging lines, the dome-shaped high-friction surfaces are designed to overcome the difficulties encountered in manually releasing lines after they are secured. Because the domes do not "jam" the line against an eccentric element, the sailor can more easily lift the line from the cleat and thus release it. Moreover, because my cleat has no moving parts, it will not stick in an open position and will be much less likely to suffer from wear or damage.

It has also been found that the dome shape of the cleat not only facilitates easy manual release, but also permits easier line insertion as well. Because the two domes define an arching inclined opening therebetween, it is easier for the sailor to pull the line up to release it, and conversely, to pull the line down to secure it.

In one embodiment, the domes are characterized by spiralling grooves as a high-friction surface. The grooves in the domes follow symmetrical, opposing spirals which serve to guide the line down as the user inserts it into the cleat and also serve to prevent the line from slipping once it is secured. While grooves are preferred for operation, it should be clear that various other textured surfaces can also form similar patterns and accomplish the same function.

Various modifications to my dome-shaped elements can also be made. For example, a number of analogous spherical and elliptical geometries may be substituted for dome-shaped elements I have described. The domed elements can encompass more than a hemisphere or can be undercut at their bases where they meet the base plate in some applications to make it less likely that the line will be released inadvertently. Additionally, since only a portion of domed elements actually contacts the line, the dome may be a section or spherical wedge rather than an entire hemisphere. The domed elements may also be encased or partially surrounded by a structure that guides the line or lines.

In another embodiment, three dome-shaped elements are arranged in a row and secured to a base plate to provide a cleat for securing two separate lines. This arrangement is most advantageous for securing the two lines that typically run from a jib sheet. Although only one of the jib sheet lines is under tension at a given time, both lines need to be available and the sailor must often switch tension quickly from one line to the other. In the three dome embodiment, one line may be held between the first and second domes while the other line is held between the second and third domes. The lines are fed from opposite sides of the cleat and the spiral pattern is alternated between the domed elements to maximize the gripping action of the cleat.

In yet another embodiment, a cleat which can secure a line against tension in either direction is constructed by employing two dome-shaped elements, each carrying a double spiral or similar high friction pattern. By forming both a left and right-handed pattern on each dome, the line can be held equally well, regardless of the direction from which it is pulled. The resulting knurled pattern can be fabricated by machining, etching or casting, depending upon the materials used.

My cleat will next be described in connection with following drawings; however, it should be clear that those skilled in the art may make various changes and modifications without departing from the spirit or scope of the invention.

DESCRIPTION OF THE PREFERRED EMBODIMENTS

Figure 1:
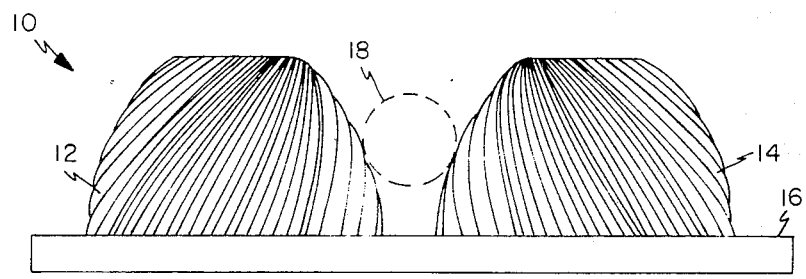
FIG. 1 is a side view of one embodiment of my cleat.

In FIG. 1 an embodiment of my cleat 10 is shown comprising dome-shaped elements 12 and 14, with opposing, spiral-grooved surfaces, secured to base plate 16. In FIG. 1 a line 18 is also shown (by dotted lines) in a position prior to insertion in the cleat 10. In operation, the line 18 is drawn down until it is snugly gripped by the surfaces of elements 12 and 14.

Figure 2:
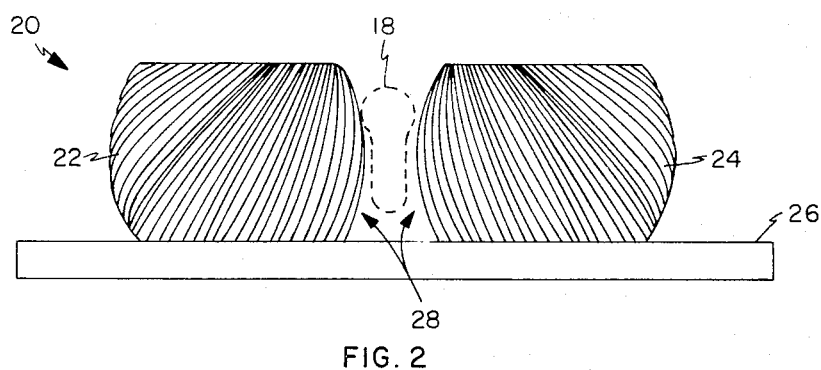
FIG. 2 is a side view of another embodiment of my cleat.

In FIG. 2 another embodiment of my cleat 20 is shown comprising dome-shaped elements 22 and 24 secured to plate 26. A line 18 (again illustrated by dotted lines) is shown partially inserted into the cleat 20. In this embodiment the elements 22 and 24 are undercut at 28 to provide protection against inadvertent release of the line 18.

Figure 3A:
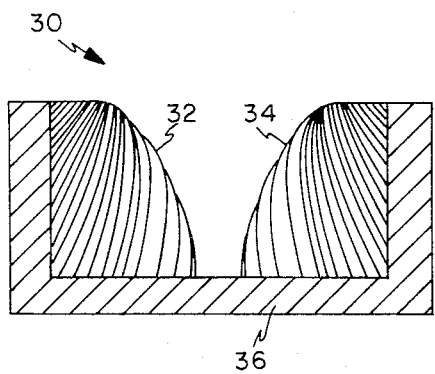
FIG. 3a is a side view of a third embodiment of my cleat.
Figure 3B:
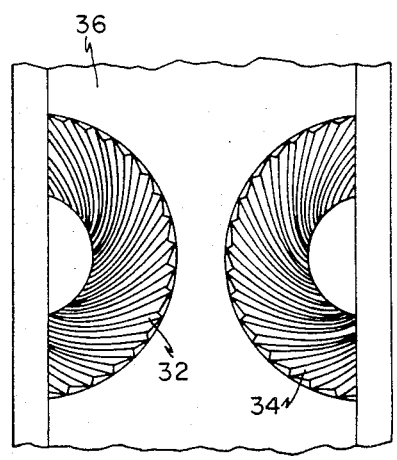
FIG. 3b is a top view of this embodiment.

In FIGS. 3a and 3b a third embodiment of my cleat 30 is shown comprising partial dome sections 32 and 34. In this embodiment the base plate 36 is wrapped around the dome sections and also serves as a guide for the line (not shown).

Figure 4A:
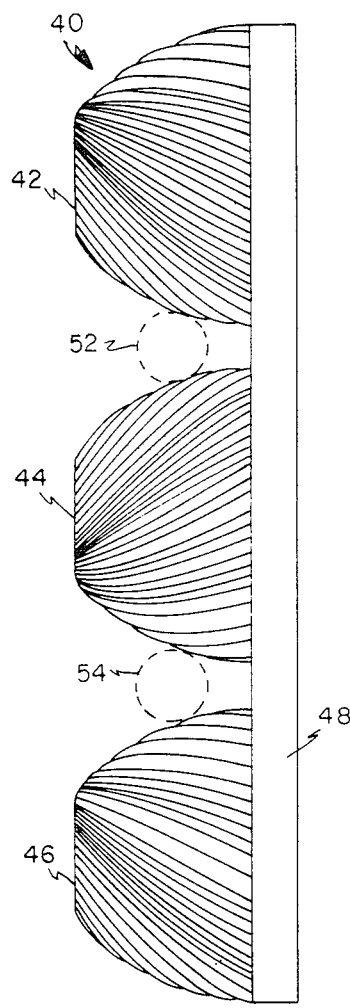
FIG. 4a is a side view of a two-line cleat.
Figure 4B:
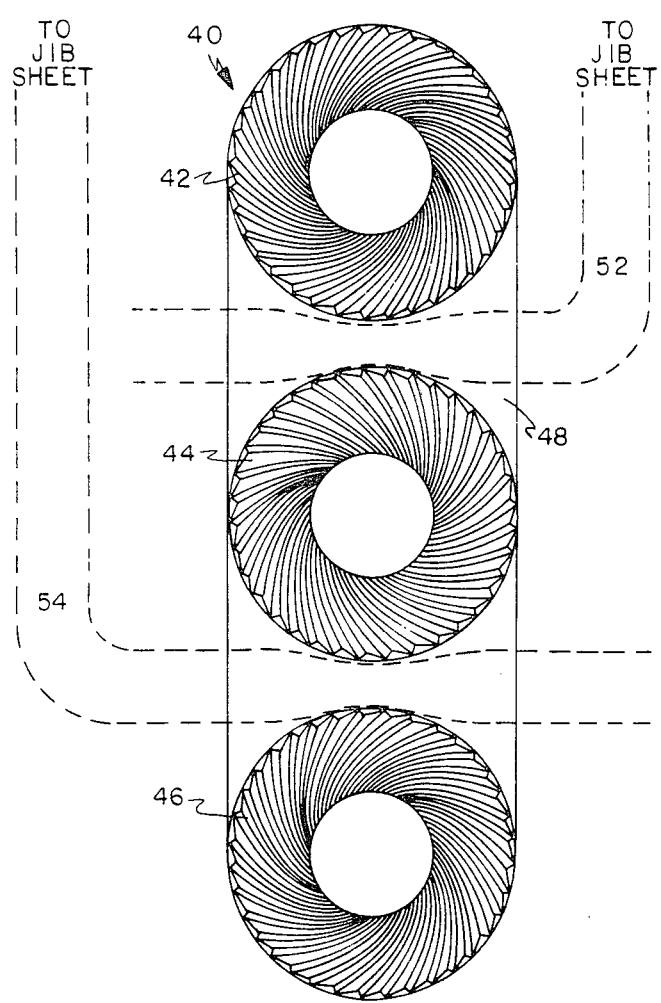
FIG. 4b is a top view of this embodiment.

In FIGS. 4a and 4b a cleat 40 for securing two lines 52 and 54 (illustrated by dotted lines) is shown comprising domed elements 42, 44 and 46 secured to base plate 48. The lines 52 and 54 are fed from opposite sides of the cleat 40 and the spiral patterns of elements 42, 44 and 46 are alternated to maximize the gripping action.

Figure 5A:
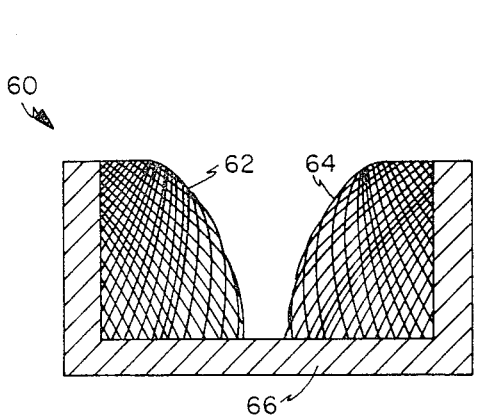
FIG. 5a is a side view of a bidirectional cleat.
Figure 5B:
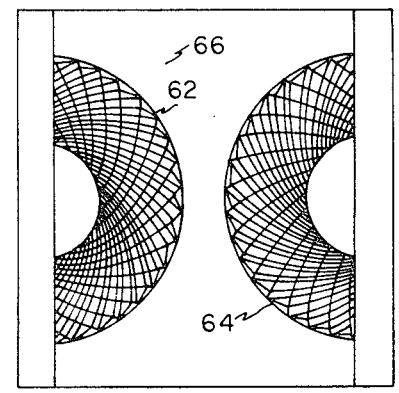
FIG. 5b is a top view of this embodiment.

In FIGS. 5a and 5b, a bidirectional cleat is shown comprising partial dome sections 62 and 64 secured to base plate 66 in a manner substantially similar to the cleat shown in FIGS. 3a and 3b. However, in the cleat of FIG. 5 each dome-shaped element carries both a left and right-handed set of spiral grooves so that a line may be secured between elements 62 and 64 and held against tension from either direction.

What I claim is:

1. A cleat for securing a line, which cleat comprises a base plate; and a pair of first and second dome-shaped, non-rotating elements fixed to the base plate, the elements being characterized by high friction, line-engaging grooved surfaces which are spaced apart and adapted to receive and hold a line therebetween, whereby the line may be secured by drawing it towards the base plate and may be released by lifting it away from the base plate.

2. The cleat of claim 1 wherein the high friction, line-engaging surfaces further comprise opposing spiral-grooved surfaces.

3. The cleat of claim 1 wherein the high friction, line-engaging surfaces further comprise a pattern of superimposed left and right spiral-grooved surfaces on each dome-shaped element.

4. The cleat of claim 1 wherein the dome-shaped elements are undercut at the locations where they are secured to the base plate.

5. The cleat of claim 1 wherein the dome-shaped elements are both spherical sections greater than a hemisphere.

6. The cleat of claim 1 wherein the dome-shaped elements are both sectioned hemispheres.

7. The cleat of claim 1 wherein the dome-shaped elements are both spherical wedges.

8. A cleat for securing two lines, which cleat comprises a base plate; and a set of first, second and third dome-shaped, non-rotating elements fixed to the base plate, the elements being characterized by high friction, line-engaging grooved surfaces which are spaced apart and arranged in a row and adapted to receive and hold one line between said first and second elements and another line between said second and third elements.

9. The cleat of claim 8 wherein the high friction surfaces of the first, second and third dome-shaped elements further comprise alternating patterns of spiralling grooves.

* * * * *